United States Patent [19]

Daumas et al.

[11] 3,978,004

[45] Aug. 31, 1976

[54] CATALYSTS FOR THE TREATMENT OF GASES CONTAINING VARIOUS DERIVATIVES OF SULPHUR

[75] Inventors: Jean-Claude Daumas, Orsay; Georges Dupuy, Fontenay-aux-Roses; Max Michel, Yerres, all of France

[73] Assignee: Rhone-Progil, Courbevoie, France

[22] Filed: Aug. 1, 1974

[21] Appl. No.: 493,761

[30] Foreign Application Priority Data

Aug. 30, 1973 France ............................ 73.31383

[52] U.S. Cl. ................................ 252/462; 252/463; 252/465; 252/466 J; 423/576

[51] Int. Cl.[2] ...................... B01J 21/04; B01J 23/10

[58] Field of Search ......... 252/462, 463, 465, 466 J; 423/573, 574 L, 576

[56] References Cited

UNITED STATES PATENTS

| | | | |
|---|---|---|---|
| 2,337,191 | 12/1943 | Greensfelder et al. | 252/462 X |
| 2,361,825 | 10/1944 | Doumani | 423/576 |
| 2,972,522 | 2/1961 | Urban | 423/573 L |
| 3,226,340 | 12/1965 | Stephens et al. | 252/462 X |
| 3,322,491 | 5/1967 | Barrett et al. | 252/462 X |
| 3,346,340 | 10/1967 | Louvar et al. | 252/462 X |
| 3,404,100 | 10/1968 | Taylor et al. | 252/462 |
| 3,483,138 | 12/1969 | Stephens | 252/462 |
| 3,760,023 | 9/1973 | Patrick et al. | 252/462 X |

*Primary Examiner*—W. J. Shine
*Attorney, Agent, or Firm*—McDougall, Hersh & Scott

[57] ABSTRACT

Catalysts for Claus reaction treatment of industrial gases containing hydrogen sulphide and sulphur dioxide in which the catalyst has a specific surface area of at least 80 sq.m./g and is composed of activated alumina and a compound of lanthanum, a lanthanide series metal of atomic number 58 to 71 or a metal of Group IIIB of the periodic classification of elements which is present, when calculated as the oxide, in an amount within the range of 1–20% by weight of the catalyst.

1 Claim, No Drawings

CATALYSTS FOR THE TREATMENT OF GASES CONTAINING VARIOUS DERIVATIVES OF SULPHUR

The present invention concerns catalysts for the treatment of industrial gases containing hydrogenated derivatives and possibly carbonated derivatives of sulphur, and also other gases.

It is known that in the chemical industry one frequently encounters gaseous mixtures of complex composition charged with sulphur compounds, such as the gaseous mixtures resulting from the purification of natural gaseous or liquid hydrocarbons, and that by scrubbing of these gaseous mixtures it is possible to recover very large quantities of sulphur. The processes for recovery of this sulphur, which have long been well known in a general way, must however be constantly improved so that the sulphur compound content of these gaseous mixtures, when scrubbed and ready for expulsion into the atmosphere, may be reduced to as low a value as possible, in view of the establishment of more and more severe pollution standards.

In the most usual way, the major part of the sulphur of the gaseous mixtures to be treated is in the form of hydrogen sulphide and the recovery of this sulphur is then generally based upon the well-known Claus reaction, which can be carried out in gaseous or liquid medium, between the sulphurous anhydride resulting generally from the oxidation of a suitable fraction of the hydrogen sulphide and the remaining quantity of this hydrogen sulphide. This Claus reaction, which is a balance, should advantageously be carried out at the lowest possible temperature in order to favour the obtaining of sulphur, and in fact can be carried out at ordinary temperature provided that the reaction is activated by means of suitable catalysts.

In industrial practice one is led, in order to obtain thorough purification, to carry out the treatment of gas mixtures containing various gaseous sulphur compounds, in a succession of catalytic stages; however it is noted that at the exit from the last stage the content of hydrogen sulphide and carbonated compounds of sulphur in the gases exceeds the usually accepted standards. Moreover, this defect in the scrubbing becomes greater and greater in time and is related to the sulphating of the catalysts which can derive from the presence of traces of oxygen in the gases to be treated and is then progressive, but can equally have its origin in accidental admissions of air to the incompletely cooled catalysts in the course of stoppages of the installations.

This progressive sulphating has the consequence of greatly diminishing the activity of the operating catalysts in relation to the elimination of carbonated compounds of sulphur, and also of reducing the activity of these catalysts in relation to the actual Claus reaction, especially if this takes place at relatively low temperatures, as is the case in the last converter of the succession of catalytic stages which is fed by a gas poor in $H_2S$ and operates at temperatures of about 200° to 220°C. These current catalysts are most often bauxite, activated charcoal, alkalinized supports, activated alumina and catalysts constituted of various sulphides, oxides or compounds, including those of molybdenum, titanium, cobalt, iron, uranium and lead, deposited on various supports.

Of all these catalysts, activated alumina is preferred provided that the sulphating is reduced as much as possible in order not to shorten the utilization life. However, the severe conditions of industrial use, utilized at present with the aim of arriving at the best possible scrubbing, have the effect that in many cases the stability of activated alumina is no longer adequate.

It has now been found that catalysts, whose supports are constituted of activated alumina, comprising compounds of a metal of lanthanum, a lanthanide series metal of atomic number 58–71 or a metal of Group IIIB of the periodic classification of elements have a particularly high resistance to aging by sulphating and, despite severe treatment in the presence of $SO_2$ and air, retain good catalytic activity for Claus's reaction. More particularly, the elements to utilize are yttrium, lanthanum, praseodymium, neodymium, samarium and gadolinium.

In order to possess all the required qualities, the catalysts, according to the present invention, must make use of a support having a specific surface area of at least 80 sq.m./g. and contain a proportion of compounds of a metal of lanthanum, a lanthanide series metal of atomic number 58–71 or a metal of Group IIIB, calculated as oxides, between 1 and 20% of their weight. By way of accessory, these catalysts can further comprise small quantities of compounds of molybdenum, cobalt, nickel, iron and uranium, although generally the presence of these other elements does not make any very notable improvements in the results obtained by the catalysts.

The catalysts, according to the invention, can be prepared in various ways. For example, one well known suitable manner consists in impregnating the activated alumina supports of desired specific surface area with solutions of metallic compounds, easily convertible to give the corresponding oxides by thermal decomposition in air, the concentration of the solutions being selected so as to obtain the desired quantity of the catalytic elements in the completed catalysts. The acidic solutions of acetates, chlorides or nitrates of the selected elements are the easiest to utilize. The additions of other metals, if their presence is desired, can easily be effected by means of nitrates for example.

Other suitable processes consist in agglomerating mixtures of aluminium oxides or hydroxides, for example activated alumina, and of oxides, hydroxides or other compounds of the various metals, it being possible for at least certain of these various metallic compounds to be in the form of gels, sols or solutions. It is likewise possible to coprecipitate the various hydroxides or other compounds or to form co-gels of hydroxides or compounds starting from sols, also to add sols carrying certain metals to the compounds of other metals.

In general, the manufacture of these catalysts is terminated by a drying and an activation step and their subsequent use involves a more or less solid fixation of sulphur, the exact nature of the bond of this element being poorly known.

The various catalysts according to the invention can be used in fixed or mobile bed or fluid bed or with aerial suspension, the dimensions of the constituent grains being adapted according to case.

The following non-limitative examples illustrate the present invention.

EXAMPLE 1

Three catalysts A, B and C are prepared by impregnation of balls of activated alumina of diameters between 2 and 4 mm., a specific surface area of 320 sq.m./g., and 0.50 cc./g. pore volume, with an aqueous solution containing the desired quantity of chlorides of various elements of Column III A so that the catalysts, after drying at 110°C. and calcination at 500°C. for 4 hours, contain a quantity of compounds of these various elements which, expressed as oxides, is equal to 3% of the total weight of the catalyst system.

Three further catalysts D, E and F are prepared by impregnation of the same balls with solutions of acetates of various elements of Column III A and are subjected to the same thermal treatment as the above catalysts A, B and C; their proportion of compounds expressed in oxides is 7% by weight.

Unimpregnated activated alumina is itself an effective catalyst and is tested here by way of comparison (catalyst T).

The catalysts are all separated into two batches. The first batches are kept as such (condition called new). The second batches are artifically sulphated by heating at 450°C. for 4 hours in a mixture containing 70% of air and 30% of $SO_2$ and used in this example for the treatment of a gaseous mixture containing 3% $H_2S$, 1.5% $SO_2$, 23% $H_2O$, 72.5% $N_2$ in a reactor having a diameter of 20 mm. The contact time is 1 second and the exit temperature is 225° or 250°C. The analysis of the gases is effected by chromatography. The indicated yield $\rho$ $SO_2$ of the Claus reaction is 100 times the ratio of the measured rate of transformation of $H_2S$ to the theoretical maximum rate of transformation deduced from thermodynamic calculation.

The results of the following Table I show clearly the advantage of catalysts A to F over catalyst T and display a slightly superior catalytic activity of the formulae based upon neodymium.

TABLE I

| Artificially sulphated catalysts | OXIDES Nature | OXIDES % by weight | Specific surface area sq.m./g. | Yield of the Claus reaction $\rho SO_2$% at 250°C | at 225°C |
|---|---|---|---|---|---|
| T | — | 0 | 280 | 56 | 46 |
| A | 75% $Nd_2O_3$ & 25% $Pr_6O_{11}$ | 3 | 270 | 84 | 80 |
| B | 50% $Y_2O_3$, 30% $Gd_2O_3$ 20% $Sm_2O_3$ | 3 | 270 | 70 | 70 |
| C | 100% $CeO_2$ | 3 | 270 | 60 | 55 |
| D | 75% $Nd_2O_3$ & 25% $Pr_6O_{11}$ | 7 | 265 | 79 | 77 |
| E | 100% $Nd_2O_3$ | 7 | 270 | 73 | 70 |
| F | 100% $La_2O_3$ | 7 | 260 | 66 | 65 |

EXAMPLE 2

Two catalysts G and H are prepared by impregnating the same balls of activated alumina as those used in Example 1 with solutions of the chlorides of neodymium and praseodymium of desired concentrations so as to obtain a quantity of compounds, expressed in oxides, of 7 and 15% of the weight of the finished catalysts. The neodymium/praseodymium ratio is the same as that indicated in Table I of Example 1 for the catalysts A and D.

These catalysts are artifically sulphated as indicated in Example 1 and compared with catalysts A and T, under the conditions of that example. The obtained results are given in the following Table II.

TABLE II

| Artificially sulphated catalysts | Oxides % weight | Specific surface area sq.m./g. | Yield of the Claus reaction $\rho$ $SO_2$ in % at 250°C | at 225°C |
|---|---|---|---|---|
| T | 0 | 280 | 56 | 46 |
| A | 3 | 270 | 84 | 80 |
| G | 7 | 260 | 85 | 92 |
| H | 15 | 245 | 86 | 93 |

These results show that the catalytic activity of the catalysts increases more slowly when their content of compounds, expressed in oxides, exceeds 10 percent of their weight.

EXAMPLE 3

The previously prepared catalysts T and D are compared in the new state and in the sulphated state under the following conditions which are substantially those of the second converter of a succession of catalytic stages.

The reactor used is the same as that indicated in Example 2. The gaseous mixtures to be treated contain 3% $H_2S$, 1.5% $SO_2$, 28% $H_2O$ and 67.5% $N_2$ and the temperatures are 225°C. at the gas entry and 268°C. at the exit. The yields are established as explained in Example 1 for contact times of 2 and 4 seconds.

The superiority of catalyst D when sulphated is made quite evident in the following Table III.

TABLE III

| CATALYSTS | Yields of the Claus reaction $\rho$ $SO_2$ in % for: 2 s. | 4 s. |
|---|---|---|
| T new | 100 | 100 |
| T sulphated | 57 | 78 |
| D new | 100 | 100 |
| D sulphated | 97 | 99 |

EXAMPLE 4

This example concerns the same catalysts T and D, subjected to a test substantially under the conditions of the third converter of a succession of catalytic stages. The reactor is the same as that of the previous two examples, fed with a gas containing 1% $H_2S$, 0.5% $SO_2$, 28% $H_2O$ and 70.5% $N_2$, the entry and exit temperatures of the catalytic bed are respectively 210° and 225°C.

In the following Table IV, the yields of the Claus reaction are expressed as indicated in Example 1 for contact times of 2 and 4 sec.

TABLE IV

| CATALYSTS | Yields of the Claus reaction $\rho$ $SO_2$ in % for: 2 s. | 4 s. |
|---|---|---|
| T new | 98 | 99 |
| T sulphated | 32 | 44 |
| D new | 97 | 100 |
| D sulphated | 77 | 98 |

These results show clearly that under the severe conditions of a third converter catalyst D permits, in the sulphated condition, of obtaining a yield greatly superior to that of the control catalyst formed of activated alumina.

EXAMPLE 5

Catalysts I, J and K are prepared by impregnating balls of activated alumina of different specific surface areas, of grains of 2 to 4 mm. diameter, with the same solution of neodymium and praseodymium acetate, the concentration of which is such that, after drying and calcination, the catalysts contain 7% of their weight of the corresponding oxides. The neodymium/-praseodymium ratio is that indicated in the previous examples.

The catalysts thus obtained are treated as previously at 450°C. with a mixture of air and $SO_2$ and compared with catalyst D under the test conditions of Example 4.

In the following Table V, the yields indicated for contact times of 2 and 4 s., show clearly the necessity of a sufficient specific surface area, at least equal to 80 sq.m./g. for these catalysts.

TABLE V

| Sulphated catalysts | Specific surface area of the catalysts | Yield of the Claus reaction $SO_2$ in % for: 2 s. | 4 s. |
|---|---|---|---|
| I | 48 | 25 | 40 |
| J | 97 | 40 | 75 |
| K | 160 | 61 | 90 |
| D | 265 | 77 | 98 |

The above examples do not limit the invention to the treatment of gases having the cited compositions. Of course, the catalysts according to the invention are usable for the treatment of gaseous mixtures much richer in sulphur compounds and which may also include, for example, carbon dioxide and ammonia gases, which do not enter into reaction.

We claim:

1. A Claus reaction catalyst for treatment of industrial gases containing hydrogen sulphide and sulphurous anhydride in which the catalyst consists essentially of activated alumina as a support having a specific surface area of at least 80 sq.m./g and at least one oxide of a metal selected from the group consisting of yttrium, lanthanum, praseodymium, neodymium, samarium and gadolinium as the essential catalyst component present in an amount within the range of 1–20% by weight and which may contain in addition a small amount of an oxide of a metal selected from the group consisting of titanium, cobalt, nickel, iron and uranium.

* * * * *